Nov. 22, 1966   E. J. ATKINSON   3,286,814
ARTICLE GROUPING DEVICE
Filed Oct. 22, 1964   3 Sheets-Sheet 1
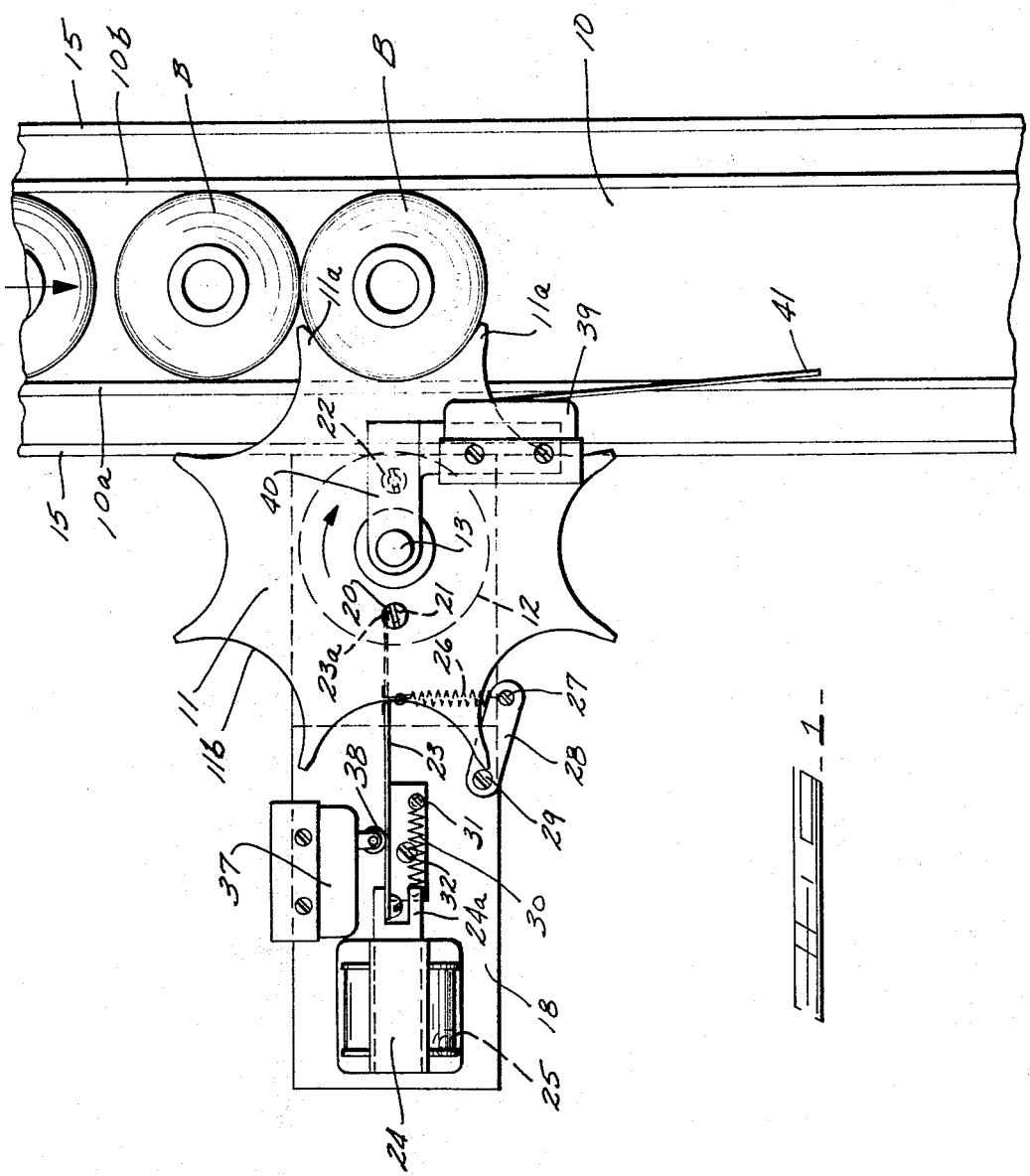
INVENTOR.
EVERETT J. ATKINSON
BY
J. R. NELSON &
W. A. SCHAICH
ATTORNEYS Nov. 22, 1966  E. J. ATKINSON  3,286,814
ARTICLE GROUPING DEVICE
Filed Oct. 22, 1964  3 Sheets-Sheet 2
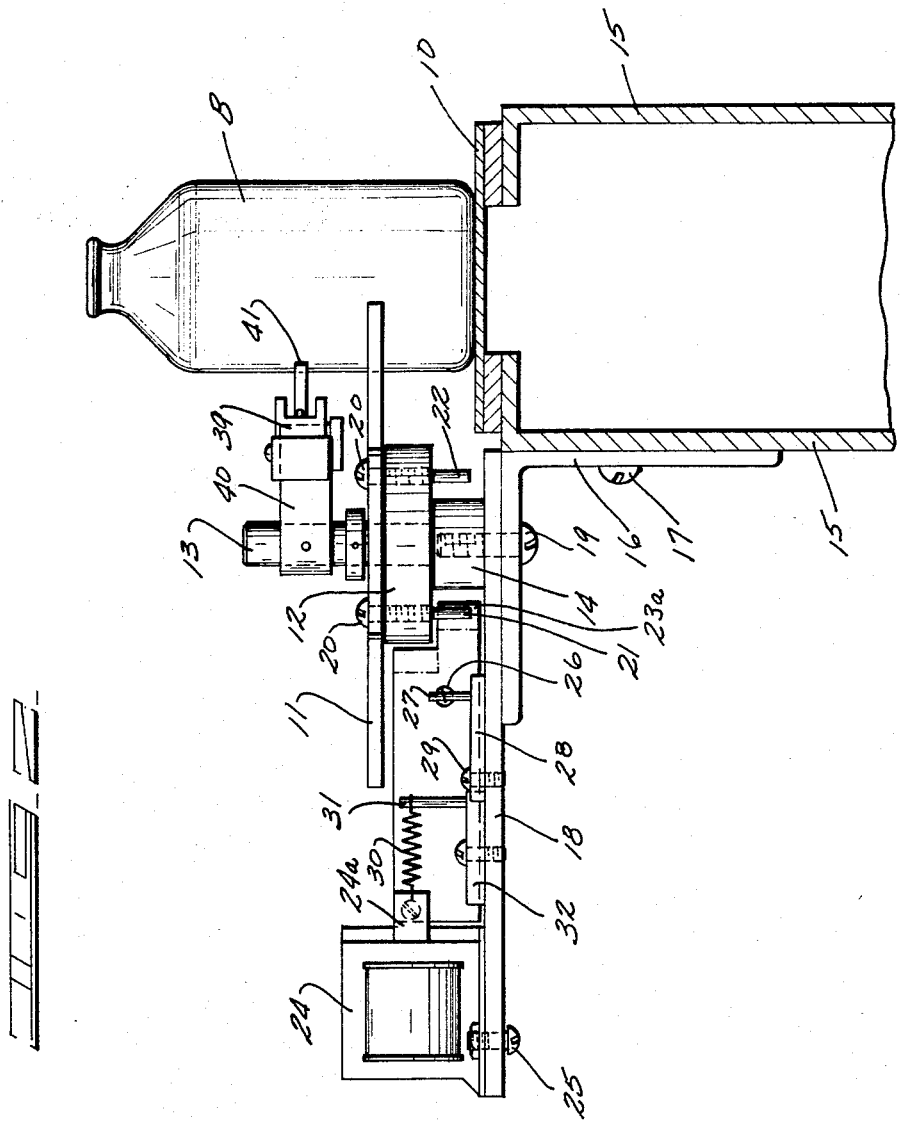
INVENTOR.
EVERETT J. ATKINSON
BY J. R. NELSON &
W. A. SCHAICH
ATTORNEYS Nov. 22, 1966  E. J. ATKINSON  3,286,814
ARTICLE GROUPING DEVICE
Filed Oct. 22, 1964  3 Sheets-Sheet 3
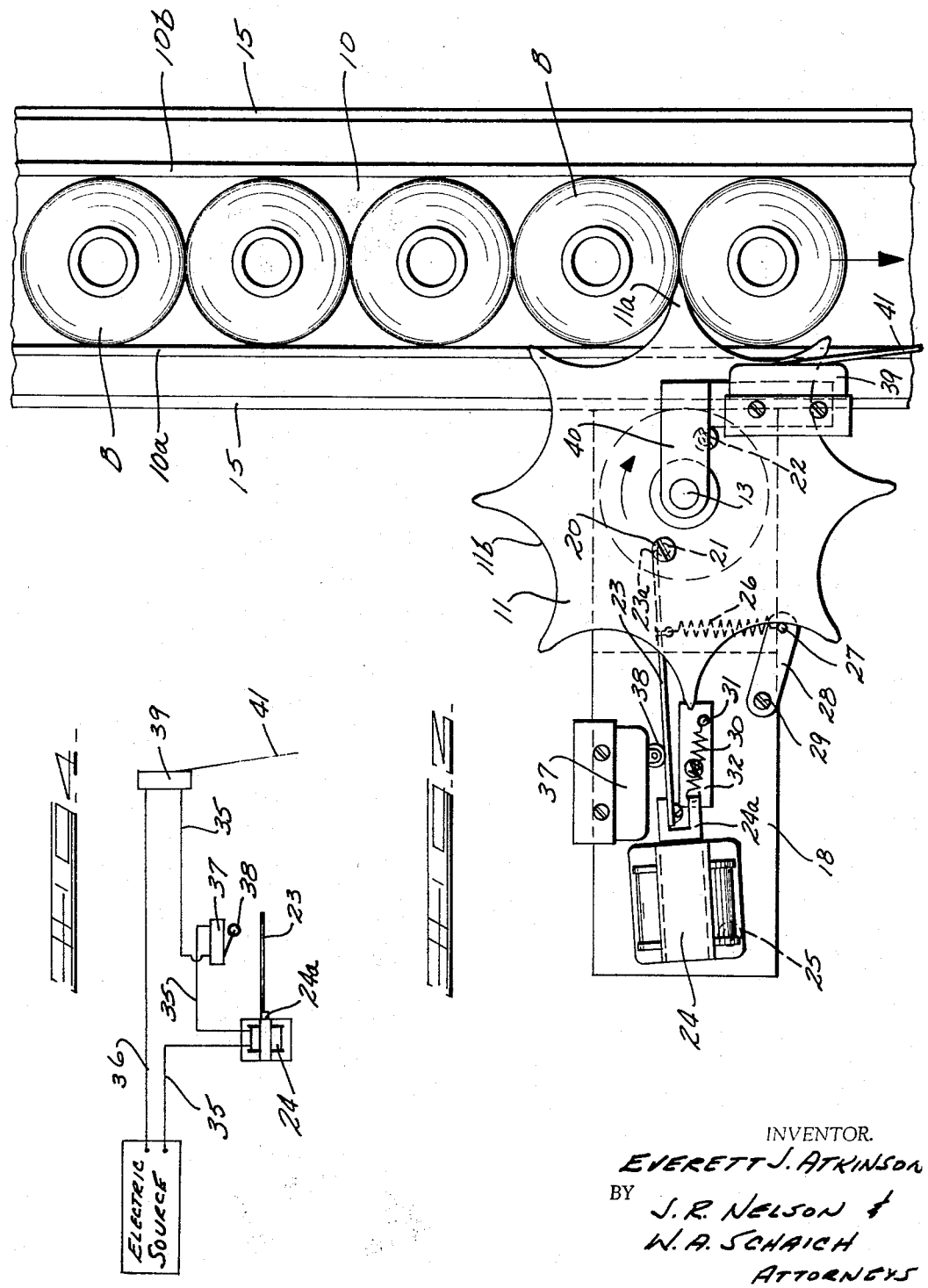
INVENTOR.
EVERETT J. ATKINSON
BY J. R. NELSON &
W. A. SCHAICH
ATTORNEYS

United States Patent Office 3,286,814
Patented Nov. 22, 1966

3,286,814
ARTICLE GROUPING DEVICE
Everett J. Atkinson, Toledo, Ohio, assignor to Owens-Illinois, Inc., a corporation of Ohio
Filed Oct. 22, 1964, Ser. No. 405,721
6 Claims. (Cl. 198—34)

The present invention relates to article handling apparatus in which a seriatim array of articles, such as glass bottles, are advancing on a conveyor in closely spaced relationship and a grouping device is mounted in relation to the conveyor to pass the bottles through it in groupings of a predetermined number or spacing, or both. The invention is adapted for grouping articles generally of substantially uniform size or dimension, typical examples being bottles and jars, cans, etc.

The invention in its preferred form comprises apparatus by which the articles are transported and guided through a grouping zone or station in succession. They are advanced from or arrested in that zone by a controlled starwheel device which operates in the path of the articles, permitting a predetermined number of the articles to pass as a group at a substantially uniform spacing therebetween and hold succeeding articles momentarily before passing them as a similar group of like number such that a wider spacing is maintained between groups.

As an example of the foregoing, the apparatus of the invention is used to group glass containers in individual groups of 3, 4, 6 or 8 by using either a 6 or 8 point starwheel mounted on a hub and having projecting contactors or points spaced radially on the hub to engage a movable arm on a solenoid armature. The armature and arm control the rotation of the starwheel. This allows the starwheel to make a predetermined amount of rotation sufficient to meter out the desired grouping of glass containers. The group of containers pass on the conveyor and are thus arranged and grouped in a convenient manner to handle them for packing, handle them for visual inspection while on the conveyor, or handle them for like operations.

The invention has as its various objects to provide a device for grouping containers:

(1) That has simplicity of design for minimum cost of construction and maintenance;

(2) That is adaptable to handle various sizes of ware;

(3) That is adaptable for installation with existing conveyors using a minimum of operating space;

(4) That is operable at speeds in conjunction with the conveyor;

(5) Wherein the timing of the grouping device is done by the containers in the conveying and handling line.

The specific nature of this invention, as well as other objects and advantages thereof, will become apparent to those skilled in the art from the following detailed description, taken in conjunction with the annexed sheets of drawings, on which, by way of preferred example only, are illustrated embodiments of this invention.

In the drawings:

FIG. 1 is a plan view of the device operating in the path of a succession of bottles on a horizontal conveyor engaging each of them in the grouping zone and grouping them into desired groups.

FIG. 2 is a side elevational view of the device of FIG. 1.

FIG. 3 is an alternate plan view of the device of FIG. 1 showing it in a different phase of operation and in the process of moving a group of containers through the starwheel by its rotation.

FIG. 4 is a schematic electrical diagram showing the electrical components of the automatic control for the starwheel device.

Referring to the drawings (FIGS. 1–3 in particular), the apparatus is shown in use for grouping bottles as they are carried along on the endless conveyor 10 driven by motor means in the usual fashion and at somewhat constant speed. The apparatus includes the 8 pocket starwheel 11 that is in the embodiment depicted on the drawings suited and adapted for grouping the containers "B" into groups of four. Starwheel 11 has an underlying hub 12 that is bearing mounted on a vertical shaft 13. Shaft 13 is supported on the boss 14. The conveyor 10 has a side frame 15 that is substantially rigid and located with reference to the conveyor surface 10. This permits a convenient mounting for the angle bracket 16 by cap screws 17. Fastened on the upper leg of bracket 16 is a horizontal plate 18. The bolt 19 connects the plate and bracket and also fastens the boss 14 in place on the plate thus locating the shaft 13 and the starwheel 11 with reference to the longitudinal center of the conveyor 10. The starwheel 11 is mounted for free rotation by the force of the bottles "B" as they engage the star points 11a of the starwheel. This drives the latter clockwise (see arrow, FIGS. 1 and 3).

The starwheel hub 12 is fastened to the starwheel 11 by cap screws 20. This permits installation of different size starwheel units on the apparatus for variations in ware size. At the underside of hub 14 are contactors 21 and 22, shown in the form of vertically projecting pins. For convenience, these may be suitably constructed as end projections on the cap screws 20 which fasten the hub and starwheel together.

In the rotary path of contactors 21 and 22 is a horizontal arm 23 fastened to the armature block 24a of the solenoid 24. Solenoid 24 is pivotally mounted on the plate 18 by the bolt 25 and is normally urged in a clockwise direction (FIGS. 1 and 3) by coil spring 26. The spring 26 has its other end fastened to the stationary pin 27 of the lever 28. The lever 28 is attached to the horizontal plate 18 by cap screw 29. The screw 29 may be loosened and the lever 28 rotatably adjusted thereby setting the extension of the spring 26 to suit the desired operation of the device. Actually, spring tension of spring 27 is related directly to operating line pressure of articles "B" at the grouping station.

The solenoid 24 is connected in the circuit so as to be normally de-energized. Spring 30 is connected to the armature 24a and a stationary post 31 integral with the holder 32 fastened to the horizontal plate 18. The spring 30 assures the armature 24a is extended and thereby arm 23 is extended at all times that solenoid 24 is de-energized. When the solenoid is energized, armature 24a retracts the arm 23 sufficiently to remove the tip portion 23a from the radial path of either of the contactors 21 or 22. So long as the solenoid is energized and the arm 23 retracted, starwheel 11 is free to rotate. Once the solenoid is again de-energized, the arm 23 will be extended and starwheel rotation will cease as one of the contactors 21 or 22 engage the tip of arm 23.

The solenoid 24 is energized in the following circuit, as shown schematically on FIG. 4. Power from a transformer source, for example rectified 24 volt D.C. source, is connected across lines 35 and 36. In circuit with line 35 is the windings of solenoid 24, above described, and a first micro-switch 37. The switch 37 is normally open and closed by its actuator 38 engaging the arm 23, earlier described. The first switch 37 is connected in series with a second micro-switch 39 that is normally closed. Switch 39, as shown on FIGS. 1-3, is mounted on a bracket 40 rigidly fastened on the upper end of shaft 13. The switch 39 has a horizontally extending lever 41 which normally intercepts the path of the articles "B" as they pass beyond the grouping station of starwheel 11. Engagement of the lever 41 with a container "B" opens switch 39 in the circuit of line 36.

In operation, the containers "B" are advanced by the conveyor 10 between the side guides 10a and 10b into a grouping station. As the lead container strikes the point 11a of the starwheel 11 it rotates clockwise until a contactor pin, such as 21 engages the arm tip 23a. This prevents further rotation of starwheel 11 until the line pressure behind the lead container "B" and starwheel point 11a overcomes the predetermined (pre-set) tension of spring 26 to pivot arm 23 and the solenoid on its mount pivot 25 to close the switch 37. Since switch 39 is normally closed, the solenoid is now energized in the circuit 35, 36, and armature 24a is retracted. Arm tip 23a releases pin 21 and starwheel 11 rotates clockwise under line pressure of containers "B". As the containers leave the starwheel 11, they are equally spaced, and the lead container "B" will next engage the lever 41 of micro-switch 39 opening the circuit. This will de-energize the solenoid and again extend arm 23 by spring 30 before the next contactor pin 22 has had an opportunity to pass the arm tip. At this point the starwheel is arrested from further rotation until solenoid 24 is again energized. Since the starwheel 11 is constructed with 8 pockets 11b and the pins 21 and 22, as shown, are diametrically located, the above-described operation will permit but ½ of one revolution of the starwheel, or, to put it another way, will permit but 4 star wheel pockets to pass through the grouping station in regular rotation. By this manner, sets of 4 containers per individual group are spaced along the conveyor 10.

If it is desired to form groups of 8 containers, one of the pins 21 or 22 may be removed and replaced with a short cap screw 20. And, should groups of less than 4 containers be desired, further pins may be employed in the hub structure. The number of containers in the grouping must, of course, be a multiple of a number of the starwheel pockets.

For example, groupings of three containers will require a similar arrangement to that illustrated herein and described above, except the starwheel will be a six-pocketed wheel. This will permit formation of either 3 or container groupings with the apparatus.

While embodiments of the present invention have been herein specifically described, other embodiments and variations may occur to those skilled in the art after a knowledge of the disclosure herein, and it is desired to include within the scope of the patent granted hereon all such embodiments and variations, and more particularly as comprehended by the appended claims.

I claim:

1. Apparatus for grouping articles into individual groups alike in number, comprising a horizontally traveling conveyor on which the articles are supported and carried forward through a grouping station, a rotatable starwheel defining a plurality of articles receiving pockets, means mounting the starwheel at said station in the path of the articles for receiving them in said pockets and guiding them forwardly through said station, and automatic means engageable with said starwheel preventing forward movement of the starwheel to arrest the articles at said station and actuated by predetermined line pressure of arrested articles to advance individual groups of said articles beyond said station, said means comprising a contactor connected to said starwheel for movement therewith in a rotary path, an arm, means mounting the arm for movement into and out of said path of the contactor, power-operated drive means connected to said arm normally moving the latter into the path of said contactor and operable for withdrawing it out of said path, said power-operated drive means comprising an electrically-operated solenoid, the arm being connected to the solenoid armature, and the solenoid is spring loaded so that when solenoid is de-energized the arm is extended into the path of said contactor, and control means connected to said drive means for energizing its said solenoid in response to a predetermined number of articles being accumulated in contact with star wheel at the grouping station.

2. The apparatus defined in claim 1, wherein the arm is pivotally mounted for movement by the contactor, the said control means for the solenoid drive means comprising a spring means connected to said arm, a mounting lever connected to said spring and adjustable for varying the tension of said spring providing a predetermined biasing tension against pivotal movement of the arm, an electrical circuit including the solenoid coil, a source of electrical energy and switch means, the switch means being mounted in the path of pivotal movement of the arm and operable by the arm, the force of a predetermined accumulation of articles against the starwheel moving the arm by the contactor to operate said switch and energize the solenoid.

3. The apparatus defined in claim 2, wherein the switch means comprises a first switch normally open and closable by said pivotal movement of the arm, and a second switch normally closed in series circuit with said first switch and including a switch operating device, means for mounting the second switch for article engagement with its said operating device after such article has advanced beyond the starwheel at the grouping station, thereby opening the solenoid circuit and again causing the arm to extend into the contactor path.

4. The apparatus defined in claim 1, wherein the starwheel has more than two said pockets and has a plurality of contactors each of which are engageable by the said arm.

5. Apparatus for grouping articles including means for conveying the articles in series fashion and guiding them in a predetermined path through a grouping station, a plural pocketed starwheel element, a vertical shaft mounted adjacent the conveyor, a hub rotatable on said shaft, means detachably fastening said starwheel element on said hub comprising plural screw elements threadedly connecting the starwheel and hub, each screw element having an outward end projection to define a contactor stop, said screw elements being located at substantially the same radius on said hub and at equally spaced radial distances on said hub, the starwheel thereon projecting into the path of the articles to intercept and guide them at said station, whereby forward rotation of said starwheel permits the advance of articles beyond said station, means controlling the forward rotation of said starwheel comprising an arm mounted for movement into and movable out of engagement with the contactors, and power means connected to said arm for automatically cyclically moving it out of the path of said contactors in response to predetermined line pressure of the articles on said starwheel and moving it into the path of the next succeeding one of said contactors, thereby allowing the predetermined number of articles of said grouping to advance through the starwheel on the conveyor.

6. The combination of means for conveying articles in succession along a predetermined path, means for guiding and confining the articles in said path through a grouping station, a rotatable starwheel projecting into said path at said station, a stop normally set to engage said starwheel and prevent its forward rotation, means actuated for disengaging said stop with the starwheel in response to a predetermined number of articles accumulating at said station, a switch controlling the actuation of said means for returning the stop to re-engage said starwheel, and a switch operating device mounted in said path forward of the grouping station, whereby a predetermined advance of accumulated articles through said starwheel and beyond said station causes the rotation of the starwheel to be arrested and permits a predetermined number of accumulated articles at the grouping station to advance on the conveyor as an individual group of articles spaced from other articles being conveyed thereon.

References Cited by the Examiner

UNITED STATES PATENTS

| | | | |
|---|---|---|---|
| 2,052,840 | 9/1936 | Nussbaum | 198—40 |
| 2,612,815 | 10/1952 | Britt | 198—40 X |
| 2,690,832 | 10/1954 | Salter | 198—40 X |

EVON C. BLUNK, *Primary Examiner.*

EDWARD A. SROKA, *Examiner.*

UNITED STATES PATENT OFFICE
CERTIFICATE OF CORRECTION

Patent No. 3,286,814                                       November 22, 1966

Everett J. Atkinson

It is hereby certified that error appears in the above numbered patent requiring correction and that the said Letters Patent should read as corrected below.

Column 3, line 54, for "3 or con-" read -- 3 or 6 con- --; line 68, for "articles" read -- article --; column 4, line 10, for "when" read -- when the --.

Signed and sealed this 26th day of December 1967.

(SEAL)
Attest:

Edward M. Fletcher, Jr.                              EDWARD J. BRENNER
Attesting Officer                                         Commissioner of Patents